(12) United States Patent
Massengale et al.

(10) Patent No.: US 7,766,028 B2
(45) Date of Patent: Aug. 3, 2010

(54) PRESSURE REGULATOR

(75) Inventors: Roger Massengale, Mission Viejo, CA (US); Stanley Fry, Riverside, CA (US); Charles J. McPhee, Huntington Beach, CA (US)

(73) Assignee: I-Flow Corporation, Lake Forest, CA (US)

( * ) Notice: Subject to any disclaimer, the term of this patent is extended or adjusted under 35 U.S.C. 154(b) by 0 days.

(21) Appl. No.: 12/484,988

(22) Filed: Jun. 15, 2009

(65) Prior Publication Data

US 2009/0250124 A1 Oct. 8, 2009

Related U.S. Application Data

(63) Continuation of application No. 11/849,571, filed on Sep. 4, 2007, now Pat. No. 7,546,846, which is a continuation of application No. 11/527,848, filed on Sep. 27, 2006, now Pat. No. 7,264,018, which is a continuation of application No. 11/217,104, filed on Aug. 31, 2005, now Pat. No. 7,114,520, which is a continuation of application No. 10/663,363, filed on Sep. 16, 2003, now Pat. No. 6,938,642, which is a continuation of application No. 09/931,385, filed on Aug. 14, 2001, now Pat. No. 6,619,308, which is a continuation-in-part of application No. 09/350,955, filed on Jul. 9, 1999, now Pat. No. 6,273,117.

(51) Int. Cl.
*G05D 16/06* (2006.01)
*F16K 15/14* (2006.01)
(52) U.S. Cl. .................. 137/15.19; 137/535; 137/519; 137/903; 251/61.2; 251/331
(58) Field of Classification Search ........... 137/505.41, 137/505.42, 12, 14, 903, 535, 15.17–15.19, 137/519, 517; 251/331, 61.1, 61.2
See application file for complete search history.

(56) References Cited

U.S. PATENT DOCUMENTS 714,143 A 11/1902 Carlson (Continued)

FOREIGN PATENT DOCUMENTS

GB 479042 1/1938

(Continued)

*Primary Examiner*—Kevin L Lee
(74) *Attorney, Agent, or Firm*—Dority & Manning, P.A.

(57) ABSTRACT

A variable device for regulating the outlet pressure of a fluid from a valve body, includes a pressure-sensing chamber having a wall formed by a resilient self-restoring diaphragm which is responsive to pressure in the chamber. A valve element connected to the diaphragm controls flow into the chamber. Increased pressure in the chamber decreases the flow into the chamber and decreasing pressure increases flow whereby fluid flow out from the chamber is maintained at a desired pressure. The outlet pressure is adjusted by deflecting the diaphragm in a direction to open the valve while permitting a section of the diaphragm connected to the valve member to remain responsive to the pressure in the chamber. An adjustment cover is provided to adjustably deflect the diaphragm and includes a catch mechanism to allow adjustment of the fluid outlet pressures and also retain the device at a desired value. An indicator arrangement may be provided to visually indicate the fluid outlet pressure.

12 Claims, 5 Drawing Sheets

U.S. PATENT DOCUMENTS

| | | | | |
|---|---|---|---|---|
| 2,960,109 A | * | 11/1960 | Wilson | 137/517 |
| 3,547,427 A | | 12/1970 | Kelly et al. | |
| 3,552,431 A | | 1/1971 | Schmidlin | |
| 3,603,214 A | | 9/1971 | Murrell | |
| 3,747,629 A | | 7/1973 | Bauman | |
| 3,825,029 A | | 7/1974 | Genbauffe | |
| 4,074,694 A | | 2/1978 | Lee | |
| 4,537,387 A | | 8/1985 | Danby et al. | |
| 4,621,658 A | | 11/1986 | Buezis et al. | |
| 4,744,387 A | | 5/1988 | Otterman | |
| 4,826,132 A | * | 5/1989 | Moldenhauer | 251/331 |
| 5,141,022 A | * | 8/1992 | Black | 137/495 |
| 5,226,446 A | * | 7/1993 | Cooper | 137/517 |
| 5,245,997 A | | 9/1993 | Bartos | |
| 5,492,146 A | | 2/1996 | George et al. | |
| 5,697,398 A | | 12/1997 | Gidney et al. | |
| 5,732,736 A | | 3/1998 | Ollivier | |
| 6,254,576 B1 | | 7/2001 | Shekelim | |
| 6,273,117 B1 | * | 8/2001 | McPhee | 137/12 |
| 6,619,308 B2 | | 9/2003 | Massengale et al. | |
| 7,114,520 B2 | * | 10/2006 | Massengale et al. | 137/553 |

FOREIGN PATENT DOCUMENTS

IT  524698  4/1955

* cited by examiner

PRESSURE REGULATOR

CROSS-REFERENCE TO RELATED APPLICATIONS

This application is a continuation of U.S. patent application Ser. No. 11/849,571, filed Sep. 4, 2007, which is a continuation of Ser. No. 11/527,848, filed Sep. 27, 2006, now U.S. Pat. No. 7,264,018, which is a continuation of U.S. patent application Ser. No. 11/217,104, filed Aug. 31, 2005, now U.S. Pat. No. 7,114,520, which is a continuation of U.S. patent application Ser. No. 10/663,363, filed Sep. 16, 2003, now U.S. Pat. No. 6,938,642, which is a continuation of U.S. patent application Ser. No. 09/931,385, filed Aug. 14, 2001, now U.S. Pat. No. 6,619,308, which is a continuation-in-part of U.S. patent application Ser. No. 09/350,955, filed Jul. 9, 1999, now U.S. Pat. No. 6,273,117, the entireties of which are incorporated by reference herein and made a part of this disclosure.

BACKGROUND OF THE INVENTION

1. Field of the Invention

This invention relates to fluid pressure regulators, and particularly to regulators well suited for controlling the output pressure of elastomeric balloon or mechanical pumps. More specifically, the present invention relates to a variable fluid pressure regulator which allows for convenient adjustment of fluid outlet pressure.

2. Description of the Related Art

Pressure regulators that reduce or cut off inlet flow of a fluid when the outlet pressure starts to exceed a predetermined maximum and that open or increase flow when the outlet pressure has been sufficiently reduced are well known in the art. Such regulators generally include a coil spring that biases a valve member open, and a pressure-sensing element responsive to excess inlet pressure which closes the valve member. In this arrangement, increasing liquid pressure compresses the spring to force the valve member towards a valve seat. As the valve member approaches the valve seat, liquid flow through the regulator becomes more restricted. When the defined pressure level is reached, further flow restriction is stopped, or the valve member contacts the valve seat to cut off flow. When the output pressure drops below the defined pressure, the valve member moves away from the valve seat and flow increases. This cycle is rapidly repeated over and over to maintain the output pressure at the desired setting.

Numerous pressure regulating devices teach the use of a coil spring, such as U.S. Pat. No. 3,412,650 by Stang, U.S. Pat. No. 3,547,427 by Kelly, U.S. Pat. No. 3,603,214 by Murrell, U.S. Pat. No. 3,747,629 by Bauman, U.S. Pat. No. 3,825,029 by Genbauffe, U.S. Pat. No. 4,074,694 by Lee, U.S. Pat. No. 4,621,658 by Buezis et al., U.S. Pat. No. 4,744,387 by Otteman, U.S. Pat. No. 5,141,022 by Black, and U.S. Pat. No. 5,732,736 by Ollivier. However, a need exists for a pressure regulator device without a spring coil, thereby resulting in a more reliable device with fewer parts which is easier to assemble and costs less.

The majority of the subject pressure regulators of the above-referenced patents are manufactured to provide a single, specific fluid outlet pressure or be adjustable between a high and a low setting. However, there also exists a need for a variable pressure regulator device that allows for the selection, from a range of values, of a desired fluid outlet pressure by a user. This capability is particularly desirable in connection with small pumps used in the medical field wherein fluids are being dispensed to a patient.

SUMMARY OF THE INVENTION

A goal of preferred embodiments is to provide a simplified pressure regulator having fewer parts thereby making it easier to assemble, less expensive and less likely to break. Instead of having the traditional springs located above and below a flexible diaphragm, a resilient diaphragm is employed that by itself controls input flow and regulates output pressure. The diaphragm is made of an elasticomeric material, and is designed not only to act as a diaphragm, but also to replace the pressure sensing spring and the valve seat spring.

Preferably, the diaphragm is manufactured to be flat, however, after installation into the regulator, an adjuster is moved to deflect the diaphragm. The amount of deflection corresponds with the desired outlet fluid pressure. The diaphragm resists deflection when outlet pressure is less than the desired level, but flexes towards a closed position when the outlet pressure exceeds this level. Thus, this diaphragm uniquely has the additional advantage of functioning as a spring without having any of the disadvantages.

Additionally, a preferred embodiment of the fluid pressure regulator includes a cover, which engages the adjuster such that rotation of the cover results in rotation of the adjuster to deflect the diaphragm and adjust the fluid outlet pressure, as described above. Such a construction advantageously allows convenient adjustment of the fluid outlet pressure by medical personnel and, thus, permits the variable fluid regulator to accommodate a variety of fluid dispensing needs.

BRIEF DESCRIPTION OF THE DRAWINGS

These and other features of the present invention will be better understood by reference to the following detailed description when considered in conjunction with the accompanying drawing wherein.

DETAILED DESCRIPTION OF THE PREFERRED EMBODIMENT

Figure 1:
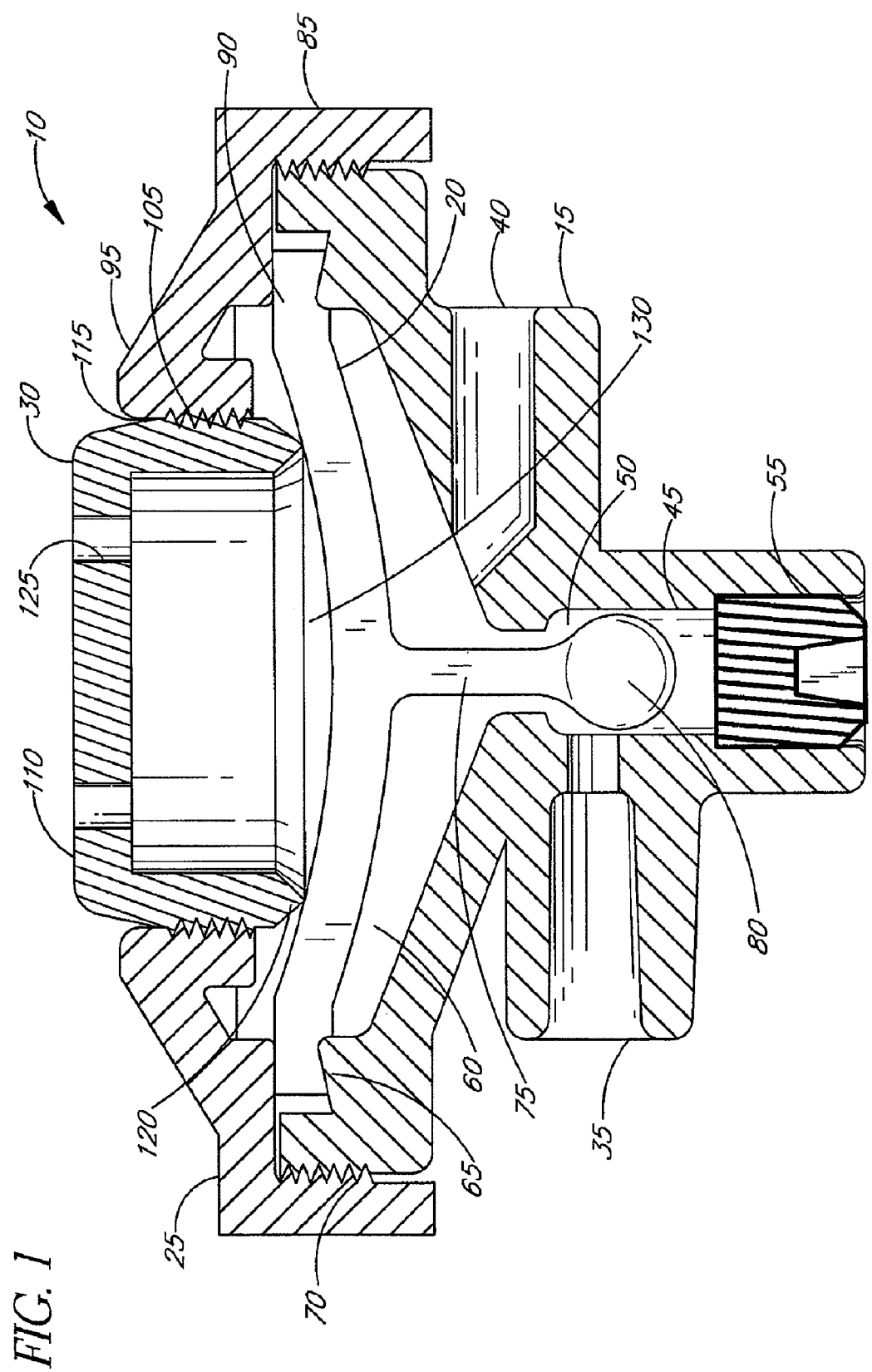
FIG. 1 is a cross-sectional view of a preferred embodiment of a pressure regulator.

Referring to the drawings, the pre-set pressure regulator, indicated generally by the numeral 10, comprises a base 15, a resilient wall or diaphragm 20, a retainer 25, and an initial adjuster in the form of a cap 30. The base 15 has an inlet 35 where fluid is introduced into the regulator 10 and an outlet 40 where the fluid exits at the desired pressure. A central, axial passage 45 extends through the base 15, and is in fluid communication with the inlet 35. The diameter of the open end at the top of the passage 45 which is smaller than the lower portion forms a valve seat 50. A plug 55 closes the lower end of the passage.

The top surface of the base 15 is concave and forms the lower boundary of a fluid pressure-sensing chamber 60. The perimeter of the top surface of the base member has an angled, annular shoulder 65 which defines a seating and gripping surface for the diaphragm 20. The shoulder 65 has an externally threaded lip 70 which mates with interior threads on the retainer 25, which is generally ring shaped. The outlet conduit 40 in fluid communication with the chamber 60 extends from the top surface of the base 15 to an exterior surface of the base 15.

The diaphragm 20 is a generally circular, preferably generally flat member which has an outer annular portion clamped between the base shoulder 65 and a flat annular surface 90 on the retainer 25 to seal that area. This causes the bottom surface of the diaphragm to form the upper boundary of the pressure-sensing chamber 60. The diaphragm is preferably made of an elastomeric material, such as silicone so that it will be responsive to fluid pressure changes in the chamber 60 and has a significant "memory" so that it is self-restoring. Depending from the diaphragm 20 is an integral valve stem 75 which extends axially through the chamber 60 and into the passage 45. A valve element 80 on the lower end of the valve stem is positioned in the passage 45 to cooperate with the valve seat 50. The valve element is preferably ball-shaped as illustrated, but may be in the form of a disk or other suitable shape that will properly mate with the valve seat. During assembly, the valve element 80 may be lubricated with alcohol to enable it to be pushed through the valve seat into the passage 45.

The retainer 25 may be ultrasonically welded to the base 15 if desired. An annular area 95 of the retainer 25 slopes upwardly, and inwardly to an interiorly threaded collar 105, which is part of the retainer. The adjuster cap 30 has a flat upper wall 110 and a cylindrical flange 115 extending downward into the collar 105. The exterior surface of the flange 115 is threaded to mate with the threads of the collar 105. The cap 30 is adjusted so that its lower annular end contacts the top surface of the diaphragm 20. The circular, central section of the diaphragm, which is bounded by the cylindrical flange 120, is responsive to fluid pressure in the chamber 60. The loading by the adjusting cap 30 pushes the diaphragm 20 downward, thereby unseating the valve element 80, as shown in the drawing. The adjuster may also be in sliding or cam-like engagement with the retainer.

The upper surface of the diaphragm 20 and the initial adjusting cap 30 form an upper interior space 130 that is separated from the pressure-sensing chamber 60 by the diaphragm 20. Vents 125 extend through the flat surface 110 of the adjusting cap 30 to prevent pressure build-up in the upper interior space 130, and to facilitate turning the adjuster cap 30 when setting the desired pressure.

The base 15, plug 55, adjusting cap 30, and retainer 25 are preferably made of polyvinyl chloride, but may be made of other durable, inexpensive materials known to those of ordinary skill in the art.

When the diaphragm 20 is assembled within the pressure regulator 10, between the angled shoulder 65 of the base 15 and the flat surface 90 of the retainer 25, the valve member 80 is seated in a sealed closed position. After a pressure source is attached to the inlet 35, the cap 30 is advanced against the diaphragm causing the annular tip of the cap flange 115 to deflect the diaphragm 20, thereby unseating the valve element 80 from the valve seat 50. While the valve element 80 is unseated, fluid travels through the inlet 35 and the valve seat 50, flows into the fluid sensing chamber 60, and out through outlet 40. The cap is adjusted until the desired outlet pressure is attained. For a preset pressure device, a suitable adhesive or the like is applied to the threads at 115 to prevent changes in the output pressure setting.

When the pressure of the fluid in the chamber 60 exerts a force against the bottom of the diaphragm 20 greater than the desired value initially set by the adjusting cap 30, a force imbalance occurs. The force of the fluid in the chamber 60 pushes the resilient central section of the diaphragm 20 upward causing the valve member 80 to move in a flow-reducing or flow stopping direction towards the valve seat 50. When the outlet pressure drops below the desired level, the resilient diaphragm central section moves the valve member 80 away from the valve seat 50 and fluid flow into the chamber 60 increases. The resiliency of diaphragm 20 provides its central section the self-restoring flexibility to respond to the pressure of the fluid in the fluid pressure-sensing chamber 60. Consequently, diaphragm 20 is an active member responsive to pressure changes without the need for a conventional spring.

The valve stem and the valve may be made of the same material as the diaphragm 20 and the valve member 80, and may be made as a one piece unit. However, a valve stem 75 made from a material stiffer than that used to make the diaphragm 20 is better able to maintain a constant pressure over a wider range of input pressures. To increase stiffness and obtain this improved effect, a rigid pin (not shown) may be inserted into the valve stem 75, after the diaphragm 20 is assembled into the valve body but before the adjusting cap 30 is installed. Alternatively, the cross section of the valve stem 75 may be increased over part or all of its length to increase stiffness. Further, the valve stem may be a completely separate part that links a separate valve element to the diaphragm.

The pressure regulator is useful in many applications but is particularly suited to control the output pressure of elastomeric balloon or other mechanical pumps.

Figure 2:
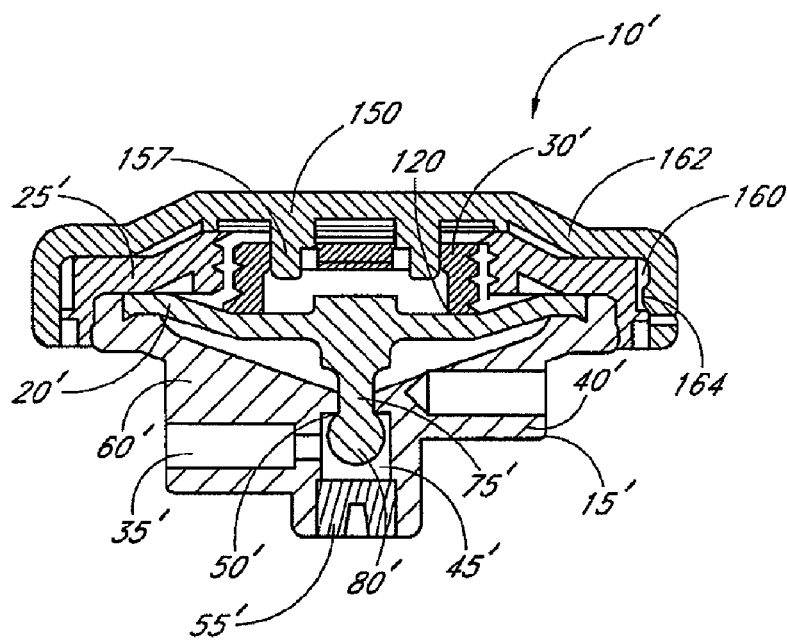
FIG. 2 is a cross-sectional view of an additional embodiment of a pressure regulator.
Figure 3:
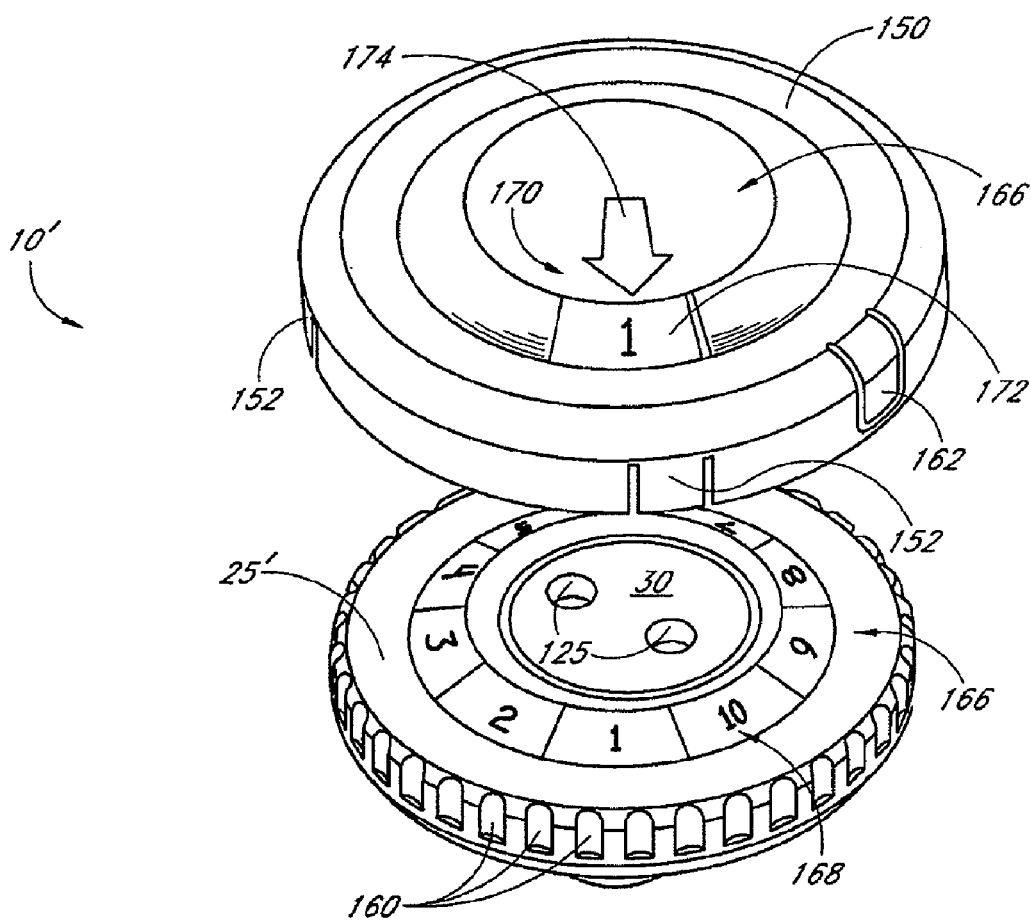
FIG. 3 is an exploded, perspective view of the pressure regulator of FIG. 2 as viewed from above.
Figure 4:
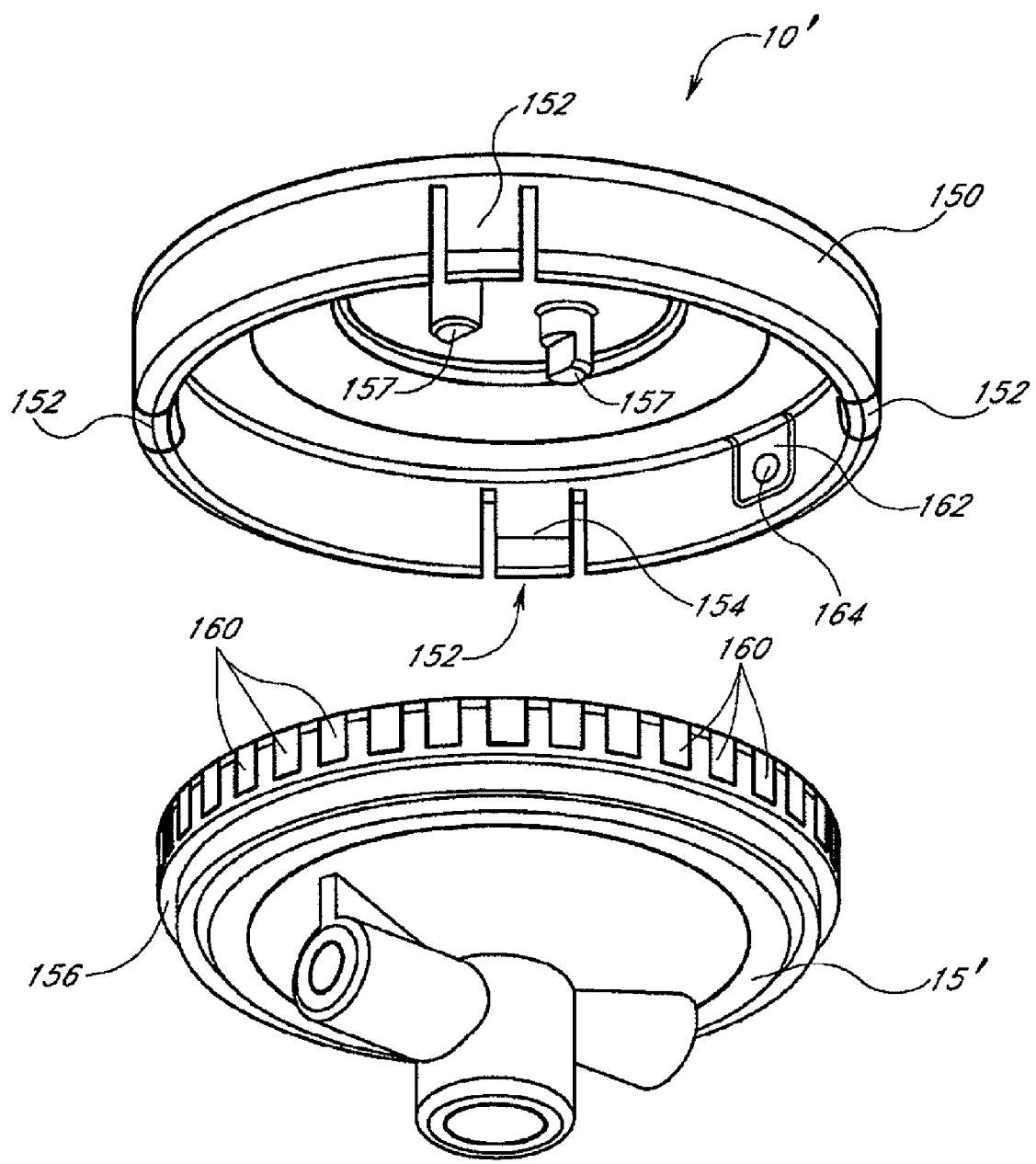
FIG. 4 is an exploded, perspective view of the pressure regulator of FIG. 2 as viewed from below.

FIGS. 2-4 illustrate an additional embodiment of a fluid pressure regulator, indicated generally by the reference numeral 10'. The pressure regulator 10' is similar in construction and function to the pressure regulator 10 of FIG. 1. Accordingly, like reference numerals will be used to denote like components, except that a (') will be added.

With similarity to the embodiment of FIG. 1, pressure regulator 10' comprises a valve body including a base 15' and a retainer 25', a resilient wall or diaphragm 20', and an adjuster in the form of a cap 30'. The base 15' has an inlet 35' where fluid is introduced into the regulator 10' and an outlet 40' where the fluid exits at the desired pressure. A central, axial passage 45' extends through the base 15', and is in fluid communication with the inlet 35'. The diameter of the open end at the top of the passage 45', which is smaller than the lower portion, forms a valve 50'. A plug 55' closes the lower end of the passage.

As with the embodiment of FIG. 1, the diaphragm 20' of the present pressure regulator 10' is clamped between the base 15' and the retainer 25'. Therefore, the bottom surface of the diaphragm 20' forms the upper boundary of the pressure sensing chamber 60'. An upper surface of the base 15' forms the lower boundary of the pressure sensing chamber 60'. Depending from the diaphragm 20' is an integral valve stem 75', which extends axially through the chamber 60' and into the passage 45'. A valve element 80' on the lower end of the valve stem is positioned in the passage 45' to cooperate with the valve seat 50'.

As in the embodiment of FIG. 1, the adjuster cap 30' of the present pressure regulator 10' is threadably engaged within a central portion of the retainer 25'. The adjuster 30' may be advanced or retracted relative to the retainer 25' such that a lower annular end 120' contacts the top surface of the diaphragm 20'. Advancing or retracting the adjuster 30' alters the force necessary to close the valve element 80' against the valve seat 50', thereby adjusting the fluid outlet pressure of the pressure regulator 10', as described above with respect to the embodiment of FIG. 1.

The pressure regulator 10' of FIGS. 2-4 additionally comprises a cover 150. Preferably, the cover 150 is rotatably supported on the retainer 25' and engages the adjuster 30' such that the adjuster 30' is fixed for rotation therewith. Thus, rotation of the cover 150 results in corresponding rotation of the adjuster 30' such that the deflection of the diaphragm 20' is altered, thereby adjusting the fluid outlet pressure.

With reference to FIGS. 3 and 4, the cover 150 preferably includes a plurality of flexible lock tabs 152. The lock tabs 152 engage the retainer 25' to hold the cover 150 in a substantially fixed axial relationship with the retainer 25', while allowing rotation with respect thereto.

Each lock tab 152 includes a substantially transversely extending lock surface 154 configured to engage a retaining surface 156 of the retainer 25'. The retaining surface 156 may be a transversely extending uninterrupted annular surface. However, the retaining surface 156 may also include a series of interrupted surfaces, preferably with the interruptions being less than a width of any one of the flexible lock tabs 152

The illustrated pressure regulator 10' includes four, equally spaced lock tabs 152 (FIG. 4), however, a lesser or greater number of lock tabs 156 may be used. Advantageously, the lock tabs 152 and retaining surface 156 construction allow assembly of the cover 150 to the retainer 25' without the use of tools or additional fasteners. However, other suitable coupling methods may also be used.

With reference to FIG. 2, the cover 150 includes a pair of downwardly extending shafts or pins 157 which engage vent holes 125' of the adjuster cap 30'. The shafts 157 may be of a smaller diameter than that of the vent holes 125' such that pressure build-up in the upper chamber 130' is avoided.

The pair of shafts 157 fix the adjuster cap 30' for rotation with the cover 150, while simultaneously allowing the adjuster cap 30' to move axially with respect to the cover 150 by sliding on the shafts 157. Thus, when the cover 150 is rotated, the adjuster cap 30' both rotates, due to its engagement with the cover 150 via the shafts 157, and moves axially with respect to the cover 150, due to its threaded engagement with the retainer 25'.

The pressure regulator 10' also includes a catch, or detent, mechanism 158 arrangement for locating the cover 150 in a desired angular position with respect to the retainer 25'. Each of a plurality of recesses 160 define a plurality of angular positions relative to the base 15'. The cover 150 includes a depending flexible tab 162 adjacent the cover periphery. The tab 162 includes an inwardly extending projection 164 (FIG. 4). The illustrated projection 164 is hemispherical in shape and each of the recesses 160 are substantially semi-cylindrical in shape. However, other suitable mating shapes may also be used, as can be determined by one of skill in the art.

With reference to FIG. 2, the catch mechanism 158 is constructed such that the projection 164 is biased into engagement with a recess 160 by the inherent biasing force of the flexible tab 162. As a result, the cover 150 and thus the adjuster cap 30' are held in one of the annular positions defined by the plurality of recesses 160. When the cover 150 is rotated relative to the base 15' with a sufficient force, the projection 164 is disengaged from its current recess 160 and moves into engagement with the next adjacent recess 160 in the direction of rotation of the cap 150. Preferably, the inherent biasing force of the flexible tab 162 is such that a caregiver and/or patient may rotate the cover 150 by hand, while also inhibiting undesired rotation of the cover 150 due to vibrations or inadvertent contact.

Advantageously, with such a construction, rotation of the cover 150 results in rotation of the adjuster cap 30' which, in turn, alters the deflection of the flexible diaphragm member 20'. As discussed above, the outlet fluid pressure is influenced by the deflection of the flexible diaphragm member 20'. Accordingly, the pressure regulator 10' allows a caregiver and/or patient to easily adjust the fluid outlet pressure to a desired value.

With reference to FIG. 3, the fluid pressure regulator 10' includes an indicator arrangement 166, which correlates the angular position of the cover 150 with a resulting fluid outlet pressure. Advantageously, with such a construction the caregiver is able to adjust the variable pressure regulator 10' to a proper outlet pressure for a specific fluid being dispensed.

The illustrated indicator arrangement 166 comprises an annular scale 168 on the retainer 25'. A reference indicia 170 is provided on the cap 150 and, when the cap 150 is assembled to the retainer 25', is aligned such that at least a portion of the scale 168 is indicated by the reference indicia 170. In the illustrated embodiment, the reference indicia 170 comprises a window 172 and an arrow 174. The window 172 is sized and shaped preferably to display one demarcation of the scale 168. The arrow 174 allows for rapid identification of the location of the window 172, and may or may not be provided.

The scale 168 of the illustrated embodiment is an index scale, which provides a relative indication of outlet pressure. Thus, each range of the index scale 168 may correspond to a predetermined value, or a range of values, for the fluid outlet pressure. Alternatively, the scale 168 may provide actual fluid pressure outlet values.

In an alternative arrangement, the scale 168 may be provided on the cap 150 and the reference indicia 170 may be located on the retainer 25', or possibly the base 15'. In this arrangement, the reference indicia 170 may comprise a projection and/or colored region of the retainer 25' or base 15'. Of course, other suitable arrangements for indicating a value on a scale may also be used. As such, it is not intended for the indicator arrangement 166 to be limited simply to the embodiments disclosed herein, but to include other suitable variations.

Figure 5:
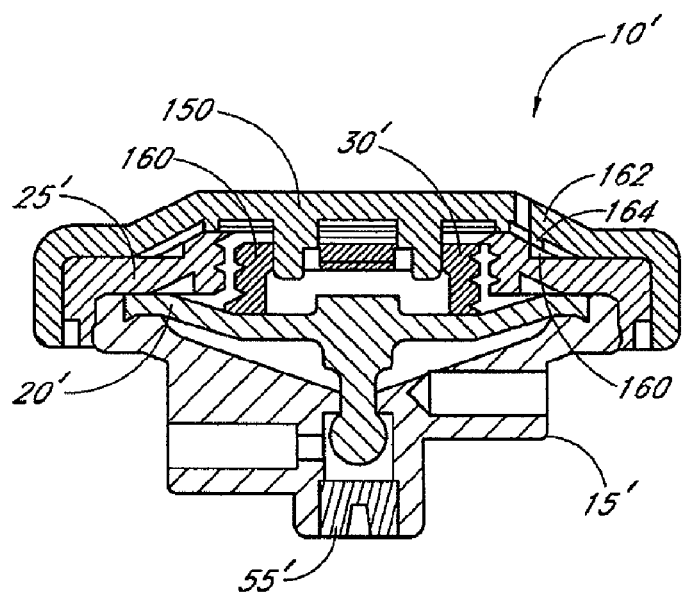
FIG. 5 is a cross-sectional view of another embodiment of a pressure regulator.
Figure 6:
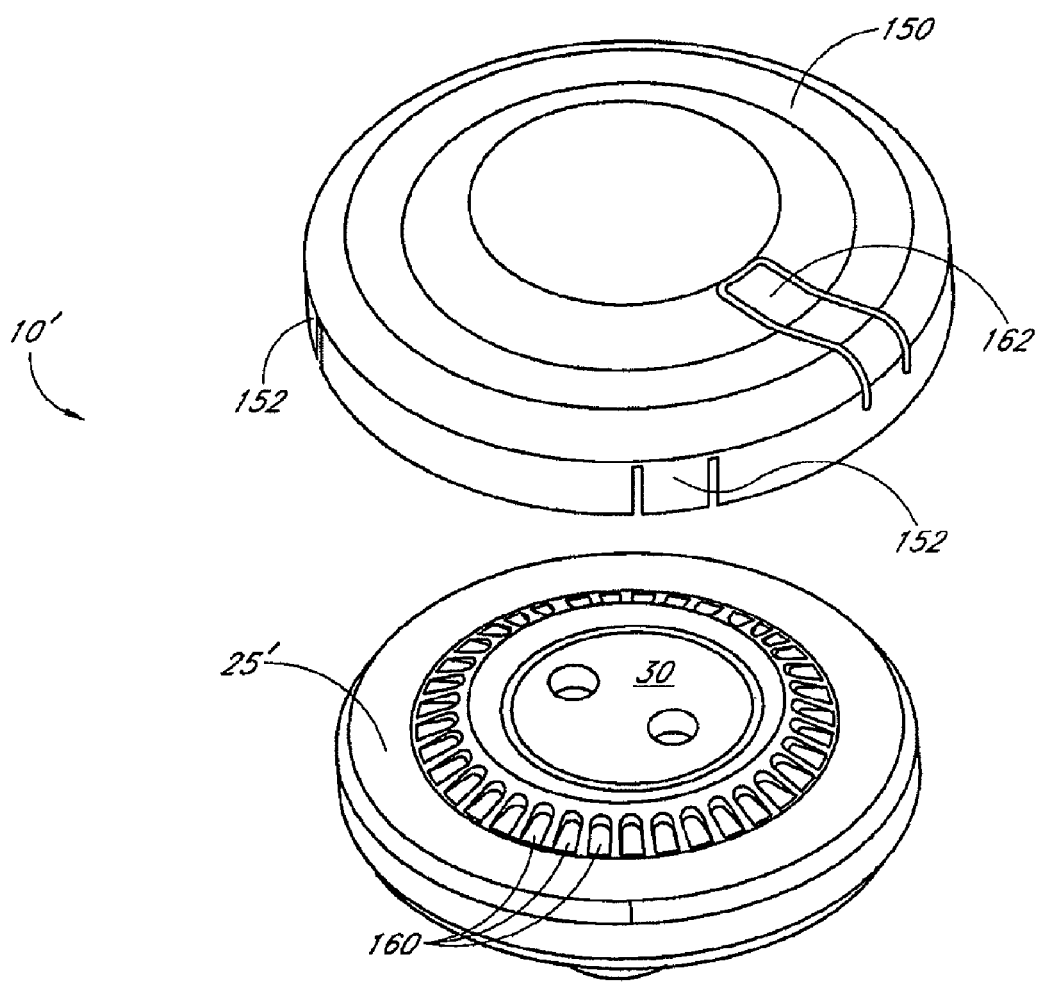
FIG. 6 is an exploded, perspective view of the pressure regulator of FIG. 5 as viewed from above.
Figure 7:
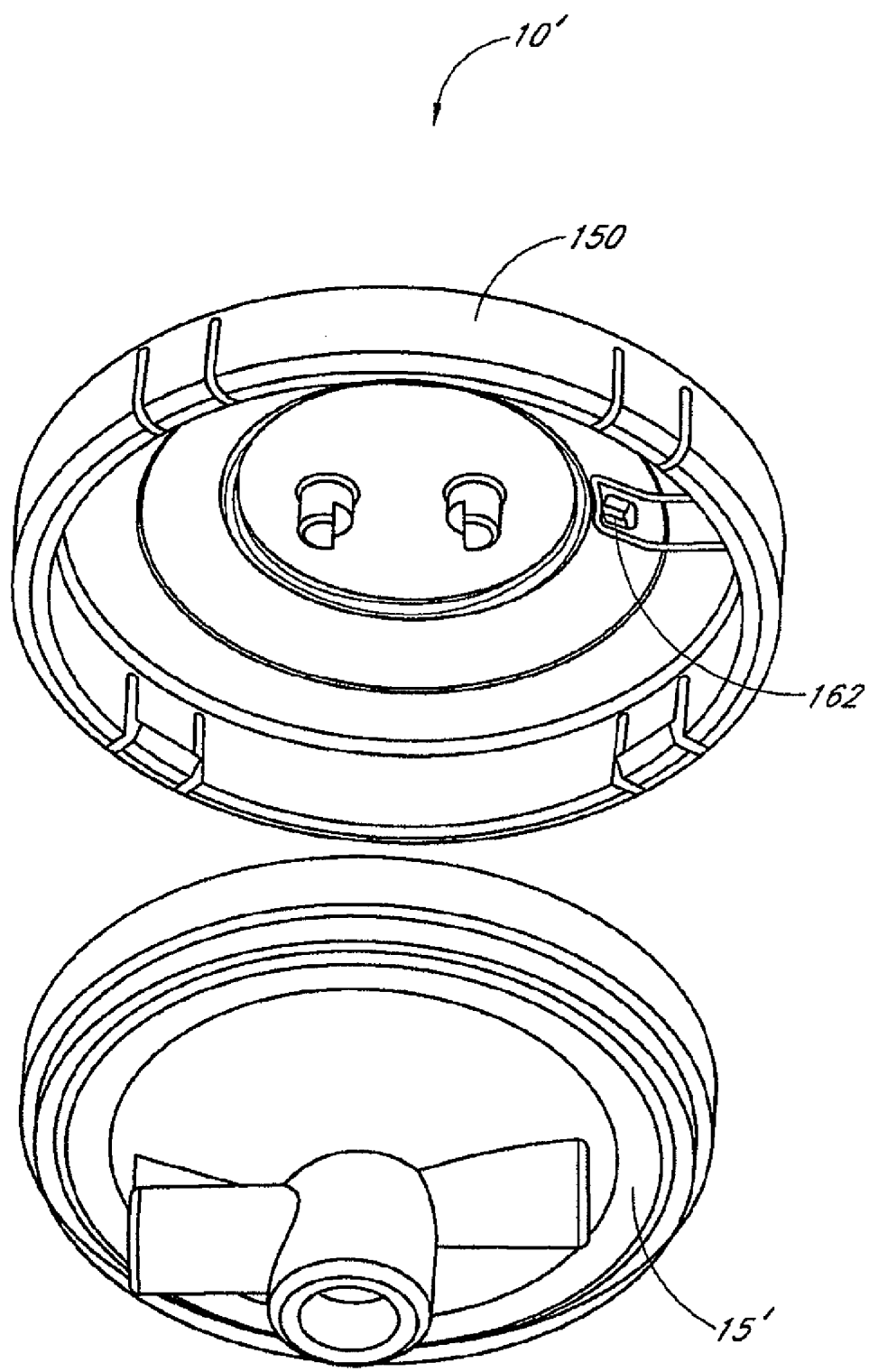
FIG. 7 is an exploded, perspective view of the pressure regulator of FIG. 5 as viewed from below.

FIGS. 5-7 illustrate an alternative arrangement of the catch mechanism 158. In this embodiment, the recesses 160 are defined on an upper annular surface of the retainer 25' and the flexible tab 162 is correspondingly located on an upper surface of the cover 150. In addition, the recesses 160 are generally triangular in cross-section, as viewed in FIG. 5, with the radially innermost wall portion being rounded (FIG. 6). With reference to FIG. 7, the projection 164 is semi-cylindrical in shape. Otherwise, the embodiment of FIGS. 5-7 is similar in construction and function to the embodiment described immediately above.

Although this invention has been described in terms of certain embodiments, other embodiments apparent to those of ordinary skill in the art are also within the scope of this invention. Thus, various changes and modifications may be made without departing from the spirit and scope of the invention. Accordingly, the scope of the invention is intended to be defined only by the claims that follow.

What is claimed is:

1. A pressure regulator control device comprising:
   a valve body defining an inlet, an outlet, and at least partially defining a fluid pressure-sensing chamber and a valve seat in fluid communication with said inlet and defining an opening into said chamber; and
   a resilient diaphragm constructed from a single piece of material, said resilient diaphragm comprising:
      a resilient wall portion forming a wall of said chamber;

a valve stem portion extending from said wall portion and through said chamber past said valve seat; and a valve element portion formed on said valve stem portion and cooperating with said valve seat to selectively block flow through said valve seat, said valve element being located between the valve seat and said fluid inlet;

wherein said resilient wall portion is normally biased so as to displace said valve element portion away from said valve seat to thereby permit an inlet flow; and wherein said resilient wall portion is configured to flex so as to displace said valve element toward said valve seat to cut off said inlet flow when an outlet pressure exceeds a threshold pressure.

2. The pressure regulator of claim 1, further comprising an adjuster configured to vary an initial deflection of said resilient wall portion, said initial deflection determining said threshold pressure.

3. The pressure regulator of claim 2, wherein said valve body is configured to fixedly grip a periphery of said resilient wall portion and wherein said adjuster is configured to vary an initial deflection of a middle portion of said resilient wall portion.

4. The pressure regulator of claim 3, wherein said valve body comprises a valve base and a retainer, said base corresponding to said inlet, said outlet, and said valve seat, said retainer mounted atop said base and having an aperture for receiving said adjuster.

5. The pressure regulator of claim 4, wherein said adjuster comprises a rotatable cap threadably engaged with said retainer.

6. The pressure regulator of claim 5, wherein said cap comprises vents configured to prevent pressure buildup in an interior space defined by a lower portion of said cap and an upper portion of said resilient wall portion.

7. The pressure regulator of claim 4, wherein said adjuster is in sliding engagement with said retainer.

8. The pressure regulator of claim 1, wherein said resilient diaphragm comprises an elastomeric material.

9. The pressure regulator of claim 8, wherein said elastomeric material comprises silicone.

10. A method of assembling a pressure regulator comprising:

providing a base defining an inlet, an outlet, and an opening, said opening defining a valve seat;

providing a diaphragm constructed from a single piece of resilient material, said diaphragm comprising:
a wall portion;
a valve stem portion extending from said wall portion; and
a valve element portion formed on said valve stem portion, said valve element sized to cooperate with said valve seat and close said opening;

passing said valve element portion through said opening; and securing a retainer to said base so as to fixedly grip a peripheral portion of said resilient wall portion between said base and said retainer, whereby a fluid pressure-sensing chamber is formed between a top surface of said base and a lower portion of said resilient wall portion;

wherein said resilient wall portion is normally biased so as to displace said valve element portion away from said valve seat to thereby permit an inlet flow; and wherein said resilient wall portion is configured to flex so as to displace said valve element toward said valve seat to cut off said inlet flow when an outlet pressure exceeds a threshold pressure.

11. The method of claim 10, further comprising securing an adjuster to said retainer, said adjuster configured to vary an initial deflection of a middle portion of said resilient wall portion, said initial deflection determining said threshold pressure.

12. The method of claim 10, wherein said adjuster comprises a rotatable cap that threadably engages said retainer.

* * * * *